United States Patent
Albrecht et al.

(10) Patent No.: US 6,762,909 B2
(45) Date of Patent: Jul. 13, 2004

(54) MAGNETIC RECORDING DISK DRIVE WITH SELF-LIMITING WEARABLE CONTACT PAD AIR-BEARING SLIDER IN HERMETICALLY SEALED ENVIRONMENT

(75) Inventors: Thomas R. Albrecht, Zurich (CH); Charles A. Brown, San Jose, CA (US); Gurinder P. Singh, San Jose, CA (US); Herman Russell Wendt, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 175 days.

(21) Appl. No.: 10/212,575

(22) Filed: Aug. 2, 2002

(65) Prior Publication Data

US 2004/0021980 A1 Feb. 5, 2004

(51) Int. Cl.[7] .............................................. G11B 33/14
(52) U.S. Cl. ................................................... 360/97.02
(58) Field of Search .......................... 360/97.01–97.04, 360/99.08, 126, 128, 125

(56) References Cited

U.S. PATENT DOCUMENTS

| | | | |
|---|---|---|---|
| 4,307,425 A | | 12/1981 | Kaneko et al. |
| 4,367,503 A | | 1/1983 | Treseder |
| 4,556,969 A | | 12/1985 | Treseder et al. |
| 4,713,279 A | * | 12/1987 | Fujiwara et al. ............ 428/142 |
| 4,831,475 A | | 5/1989 | Kakuda et al. |
| 4,841,101 A | | 6/1989 | Pollock |
| 5,075,807 A | | 12/1991 | Inoue et al. |
| 5,392,177 A | | 2/1995 | Chainer et al. |
| 5,454,157 A | | 10/1995 | Ananth et al. |
| 5,457,606 A | | 10/1995 | Young et al. |
| 5,880,904 A | * | 3/1999 | Mizoshita et al. ........ 360/97.01 |
| 5,994,035 A | * | 11/1999 | Tsukamoto et al. ......... 430/320 |
| 6,144,178 A | | 11/2000 | Hirano et al. |
| 6,317,286 B1 | | 11/2001 | Murphy et al. |
| 6,643,093 B2 | * | 11/2003 | Brown et al. ............ 360/97.02 |
| 6,646,827 B1 | * | 11/2003 | Khizroev et al. ........... 360/125 |
| 6,680,813 B2 | * | 1/2004 | Dague et al. ............ 360/97.01 |
| 2003/0053253 A1 | * | 3/2003 | Mundt et al. ............ 360/236.3 |

FOREIGN PATENT DOCUMENTS

| | | | |
|---|---|---|---|
| JP | 406309625 A | * | 11/1994 |
| WO | WO 01/80225 A1 | | 10/2001 |

OTHER PUBLICATIONS

"Elimination of Breather Holes in Magnetic Disk Files", IBM Technical Disclosure Bulletin, Oct. 1989, p. 399.
"Method of Sealing Disk Files", IBM Technical Disclosure Bulletin, Apr. 1990, pp. 295–296.
"Permeation Limiting Gasket for Direct Access Storage Devices", IBM Technical Disclosure Bulletin, May 1995, pp. 535–536.
"Laser Micro–welding for the Photonics Industry", a report by Equilasers, Inc., Global Photonics Applications and Technology, Technology & Telecoms Briefing, Nov. 2001.

* cited by examiner

Primary Examiner—Allen Cao
(74) Attorney, Agent, or Firm—Thomas R. Berthold

(57) ABSTRACT

A magnetic recording disk drive has self-limiting wear contact type air-bearing sliders that support the read/write heads. The magnetic elements of the read/write head extend into and are surrounded by a wearable pad that protrudes beyond the air-bearing surface of the slider. The end of the protrusion pad and the ends of the magnetic elements are covered by a corrosion-resistant overcoat that protects the magnetic elements during slider fabrication and disk drive assembly. The overcoated protrusion pad sliders are assembled into the disk drive in a special environment, typically air with humidity controlled below a level above which corrosion of the magnetic elements would occur. The drive is then hermetically sealed and the drive is operated with the protrusion pads in contact with the disks until the overcoats and a portion of the pads are worn or burnished away. The combination of protrusion pad air bearing sliders with a hermetically sealed disk drive in a controlled atmosphere, and the burnishing of the head overcoat either after the drive has been sealed or under controlled humidity conditions prior to sealing, allows for a very low magnetic spacing to be achieved in manufacturable disk drives.

21 Claims, 3 Drawing Sheets

MAGNETIC RECORDING DISK DRIVE WITH SELF-LIMITING WEARABLE CONTACT PAD AIR-BEARING SLIDER IN HERMETICALLY SEALED ENVIRONMENT

TECHNICAL FIELD

This invention relates to magnetic recording disk drives, and more particularly to disk drives that prevent corrosion of the magnetic elements of the read/write heads.

BACKGROUND OF THE INVENTION

Magnetic recording disk drives store digital data in the magnetic recording medium of a rotating storage disk. The disks are coated with a magnetizable medium and mounted on the hub of a spindle motor for rotation at high speed. Data is stored as magnetic transitions on the disks in a plurality of concentric circular data tracks. The data is recorded and read by a read/write transducer or head. Each read/write head is located on the trailing end of an air-bearing slider, with the air-bearing surface (ABS) of the slider supporting the slider above the rotating disk. Each slider is mounted on the end of an arm of a rotary actuator that moves the sliders and attached heads across the disk surfaces. The write head is an inductive write head with the magnetic elements being the magnetic poles that generate the magnetic write fields. The read head is a magnetoresistive (MR) read head, which may be a spin-valve type giant magnetoresistance (GMR) sensing element, or the more recently proposed magnetic tunnel junction (MTJ) sensing element.

An important parameter affecting the recording density of a disk drive is the magnetic spacing between the magnetic elements (the write poles and the MR sensing element) and the magnetizable medium of the disk. Closer magnetic spacing allows for smaller magnetic "bits", which in turn allow for narrower track widths and consequently a greater recording density. However, the magnetic spacing is limited to a certain extent by the thickness of the protective overcoat on the magnetic elements, which is required because the magnetic elements are formed of materials that are highly corrosive, especially in the presence of water vapor. For example, the magnetic elements may typically contain materials such as Co, Ni, Fe, Ta, and Cu. More specifically, MR sensing elements, including MTJ sensing elements, may contain Co, Cu, Ru, NiO, FeMn and NiMn, and high-moment write poles may contain alloys of Co, Fe and Ni. These metallic head materials are susceptible to corrosion during manufacture, storage and use. The protective overcoat protecting the magnetic elements is typically a thin amorphous "diamond-like" carbon overcoat. In the absence of this impermeable overcoat, water and other corrosive vapors are able to penetrate into the reactive metal films of the magnetic elements, thus rendering the read/write head unreliable.

A self-limiting wear contact pad (or "protrusion pad") air-bearing slider provides for very low and tight tolerance magnetic spacing by reducing the effect of tolerances associated with slider fabrication and disk dive mechanical assembly, elimination of head overcoats, and elimination of head recession. This type of air-bearing slider, in which the head overcoat and part of the protrusion pad are relatively quickly "burnished" or worn away during initial contact with the rotating disk, is described in IBM's pending application "Self-Limiting Wear Contact Pad Slider and Method for Making", Ser. No. 09/687,234 filed Oct. 13, 2000, which is incorporated herein by reference. However, the absence of a head overcoat to protect the magnetic elements has been discovered to be unacceptable in conventional disk drives due to the risk of corrosion. Thus disk drives with vapor phase corrosion inhibitors (VPCI) to prevent corrosion of uncoated heads has been proposed, as described in IBM's pending application "Magnetic Recording Device with Improved Reliability", Ser. No. 10/051,866 filed Jan. 15, 2002, which is incorporated herein by reference.

What is needed is a disk drive with a read/write head that does not require a protective coating to prevent corrosion of the head's magnetic elements so that the magnetic spacing in the disk drive can be reduced.

SUMMARY OF THE INVENTION

The present invention is a disk drive with self-limiting wear contact type air-bearing sliders with overcoated heads to protect the magnetic elements during slider fabrication and disk drive assembly, but in which the overcoats are later removed and the heads maintained in a hermetically sealed disk drive housing. The overcoated protrusion pad sliders are assembled into the disk drive in a special environment, typically air with humidity controlled below a level above which corrosion of the magnetic elements would occur. The drive is then hermetically sealed and the drive is operated with the protrusion pads in contact with the disks until the overcoats and a portion of the pads are worn or burnished away. The combination of protrusion pad air bearing sliders with a hermetically sealed disk drive in a controlled atmosphere, and the burnishing of the head overcoat either after the drive has been sealed or under controlled humidity conditions prior to sealing, allows for a very low magnetic spacing to be achieved in manufacturable disk drives.

For a fuller understanding of the nature and advantages of the present invention, reference should be made to the following detailed description taken together with the accompanying figures.

DETAILED DESCRIPTION OF THE INVENTION

The disk drive of the present invention is a hermetically sealed drive with self-limiting wear contact pad air-bearing sliders that support read/write heads having no carbon overcoat, so that there is a low magnetic spacing during operation. A self-limiting wear contact pad slider includes a wearable or self-burnishing protrusion pad near the trailing end of the slider that surrounds the MR sensing element and the inductive write poles and includes an overcoat to protect the magnetic elements. During an initial reduced-RPM (or reduced atmospheric pressure) wear-in, the disk is rotated with the protrusion pad in contact so that the overcoat wears away and the pad wears down by rubbing on the disk until the interference is zero. At normal full-RPM operation, a very small clearance exists between the end of the protrusion pad and the disk surface, which assures reliability of the head-disk interface. Because the drive is hermetically sealed in a controlled environment the magnetic elements are not susceptible to corrosion.

Figure 1A:
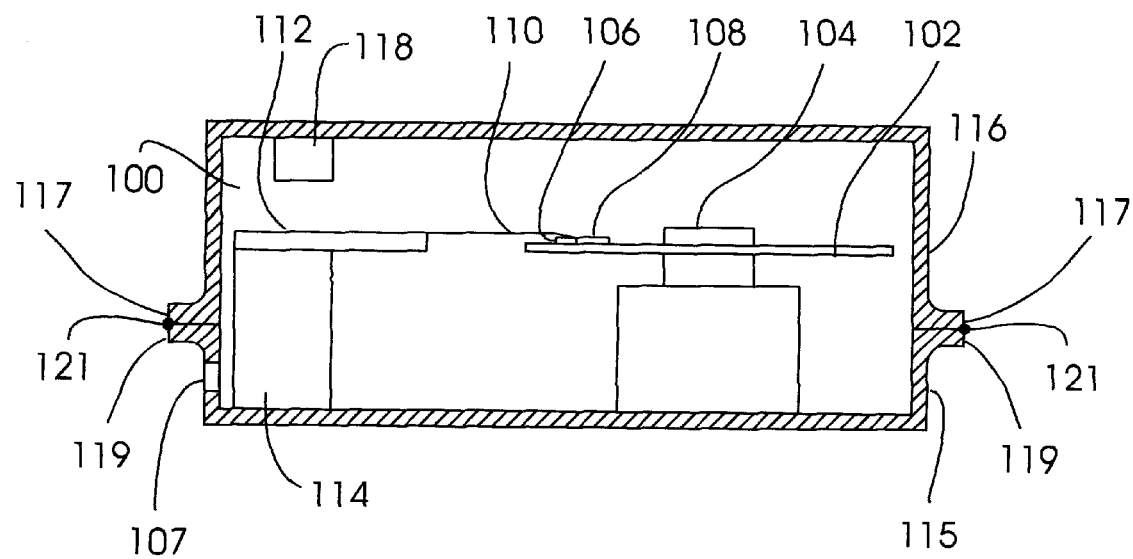
FIG. 1A is a cross-sectional view of the hermetically sealed magnetic recording disk drive according to the present invention.
Figure 1B:
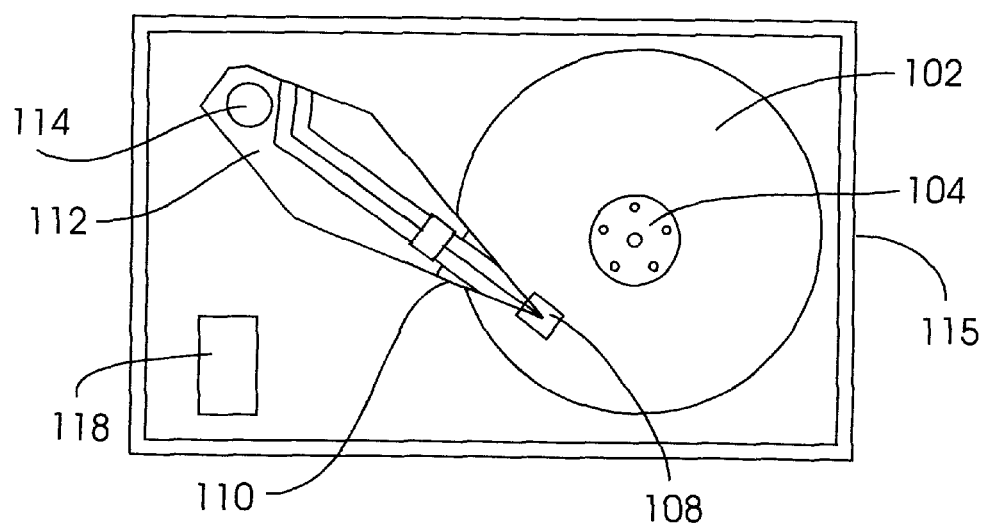
FIG. 1B is a top view of the magnetic recording disk drive of FIG. 1A with the top cover removed.

In an exemplary embodiment of the present invention as shown in FIGS. 1A–B, the disk drive is hermetically sealed at the flanges 119, 117 of base plate 115 and top cover 116, respectively, to protect against the corrosion of the magnetic elements. FIGS. 1A and 1B are cross-sectional and top views, respectively, of a hard disk drive 100. Hard disk drive 100 includes a magnetic recording disk 102 including a substrate of glass, AlMg alloys or ceramic, a metallic magnetic layer, a protective overcoat typically formed of amorphous "diamond-like" carbon, and a lubricant layer. Hard disk drive 100 further includes a read/write head 106 (typically a MR read element and an inductive write head with pole tips) formed on the trailing end of an air-bearing slider 108 for magnetically reading and writing data in the magnetic layer of the disk 102. The magnetic elements of head 106 and the magnetic recording disk 102 are coated with a thin essentially amorphous carbon ("diamond-like" carbon) overcoat of about 1 nm to 10 nm thickness. The magnetic recording disk 102 is rotated relative to the slider 108 by a drive motor 104. The slider 108 is a self-limiting wear contact pad slider connected to a suspension 110 which is connected to an actuator 114 by means of a rigid arm 112. While only a single head and disk are shown in FIGS. 1A–1B disk drives may contain multiple disks, with the heads being supported on multiple arms attached to the actuator. The entire structure is enclosed in a hermetically sealed housing formed by base plate 115 and cover 116. "Hermetically" sealed means that the seal is so tight that the disk drive's internal pressure is substantially independent of the external or ambient pressure. This is in contrast to a conventional or non-hermetically sealed disk drive that has a breather port with filter in a wall of the base plate or cover for equalizing the disk drive's internal pressure with the external pressure. Thus a hermetically sealed drive does not contain a breather port. It is also important that the hermetic seal have very low permeability to water.

Figure 2:
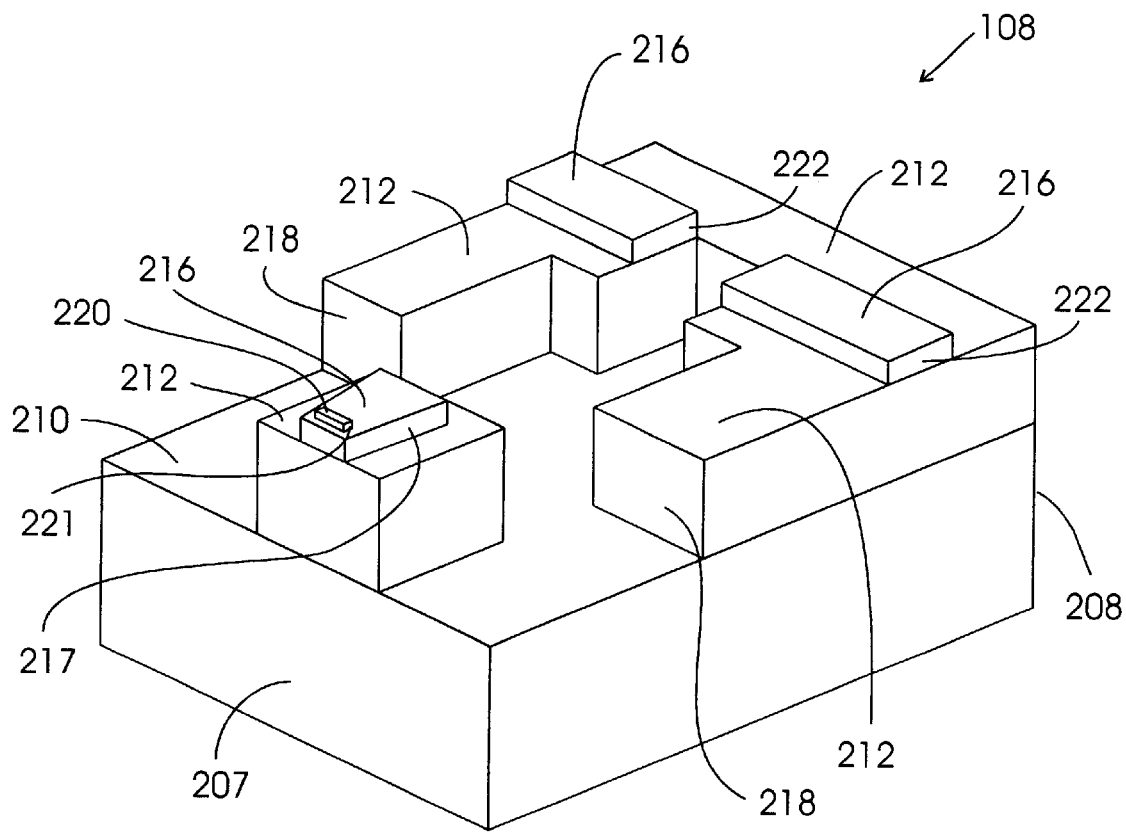
FIG. 2 is a perspective view of the self-limiting wear contact pad air-bearing slider for use in the disk drive of the present invention.

FIG. 2 shows the self-limiting wear contact pad slider 108 used in the disk drive of the present invention. A conventional slider design starts off with a flat polished surface from which a patterned air bearing surface (ABS) is created by a removal process such as etching or ion milling. The ABS is the top most polished surface and pressurizes with air from the rotating disk to lift the slider and support it above the disk. The slider 108 has a rear or trailing end 207 and a front end 208 and is formed using a dual etch design with three surface levels 210, 212, 216. A third etch is then performed to produce a fourth surface level 220. The depth of the third etch produces the protrusion pad 221 that is designed to have a height above surface 216 that is greater than or equal to the fly height of the slider with an ABS of surfaces 216. Accordingly, the top most surface 220 is now the end of a small, non-actuatable wearable contact pad 221 that surrounds the magnetic elements, i.e., the write head pole tips and the MR read element. The self-limiting contact pad 221 has an outer thin carbon overcoat that wears away when it comes into contact with the rotating disk surface. The pad 221 protrudes beyond the surface 216 of rear foot 217 and is small enough that surface 220 does not provide any significant air-bearing effect to the slider 108. The pad 221 is also small enough so that it will wear quickly and easily and will not affect the fly height as it wears down, which provides the pad 221 with the ability to achieve an interference of zero typically formed with the disk surface. The body of slider 108 is one or more materials, such as alumina ($Al_2O_3$), $TiC/Al_2O_3$ composite, or silicon, which also make up the pad 221. The surfaces 216 of rear foot 217 and front pads 222 on side rails 218 together form the ABS of slider 108. The surface area of the end of wear pad 220 is less than 5% of the total area of the ABS.

Figure 3:
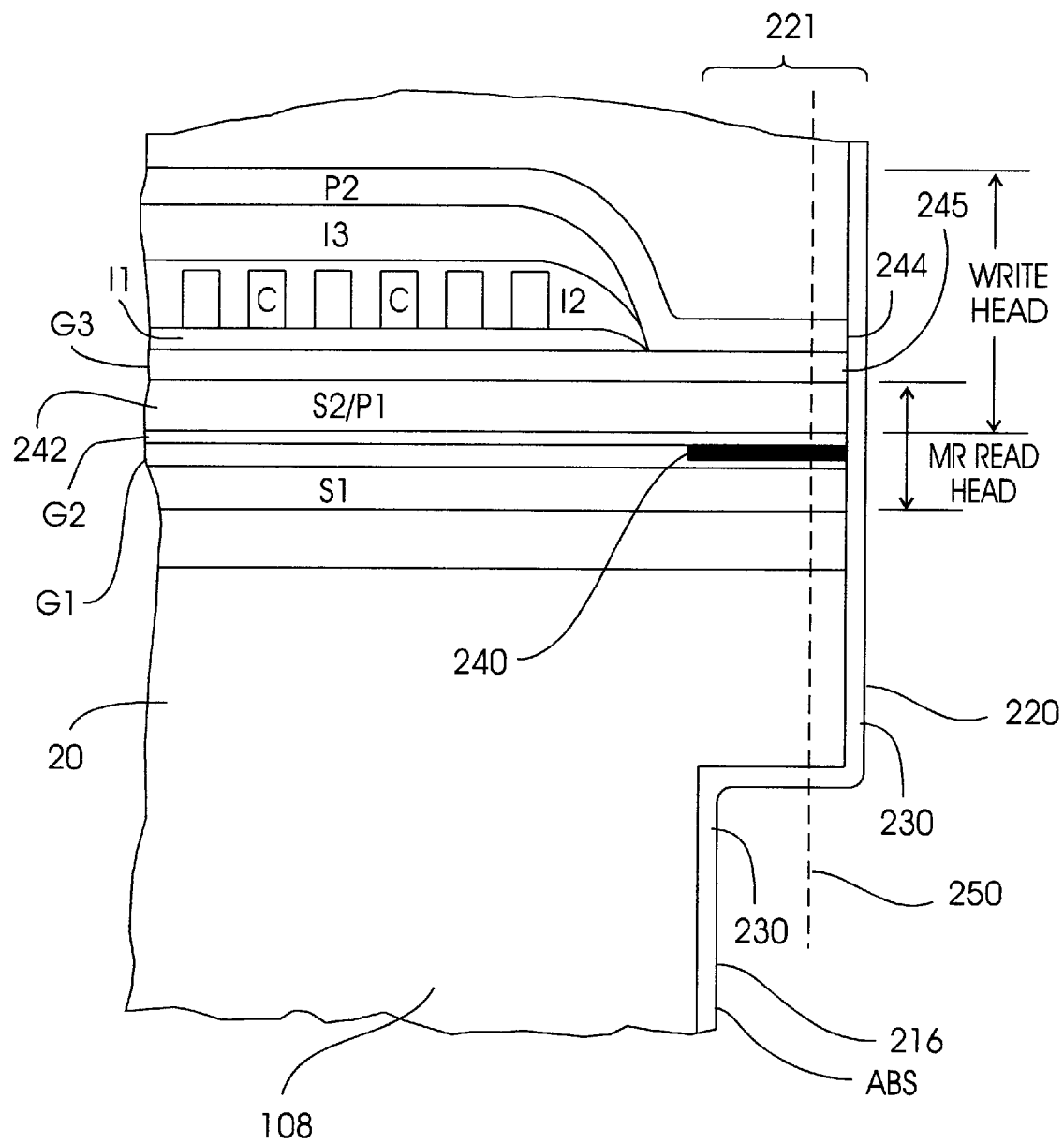
FIG. 3 is a sectional view of the protrusion pad portion of the slider of FIG. 2 illustrating the protrusion pad with magnetic elements and carbon overcoat prior to being worn away.

FIG. 3 is a cross-sectional schematic view of the read/write head 106 which has its magnetic elements protruding into and surrounded by the material of protrusion pad 221. The pad 221 protrudes beyond the surface 216, which forms part of the ABS of slider 108. An overcoat, typically amorphous diamond-like carbon, is formed as a film 230 over the end of protrusion pad 221 and the ends of magnetic elements 240 and 242, 244. The read head includes an MR sensing element 240 sandwiched between first and second gap layers G1 and G2 which are, in turn, sandwiched between first and second magnetic shield layers S1 and S2. The electrical conductors (not shown) that lead out from the MR sensing element 240 to connect with the sense circuitry are in contact with the MR sensing element 240 and are located between element 240 and the gap layers G1, G2. The gap layers G1, G2 thus electrically insulate the electrical leads from the shields S1, S2. The write head includes a coil layer C and insulation layer I2 which are sandwiched between insulation layers I1 and I3 which are, in turn, sandwiched between first and second pole pieces P1 and P2. A gap layer G3 is sandwiched between the first and second pole pieces P1, P2 at their pole tips 242, 244 adjacent to the ABS for providing a write gap 245. During writing, signal current is conducted through the coil layer C and flux is induced into the first and second pole layers P1, P2 causing flux to fringe across the pole tips 242, 244. During reading, magnetized regions on the rotating disk 102 inject flux into the MR sensing element 240, causing resistance changes in the MR sensing element that are detected as voltage changes. The read/write head 106 shown in FIG. 3 is called a "merged" head because the second shield layer S2 of the read head is employed as a first pole piece P1 for the write head. In a "piggyback" read/write head (not shown), the second shield layer S2 and the first pole piece P1 are separate layers. In the disk drive of the present invention, the slider 108 thus flies at a certain fly height and has a protruding pad 221 which will put the pad 221 with its outer carbon overcoat 230 in contact with the disk for a wide range of manufacturing tolerances.

When the slider 108 and disk 102 are first put together, the disk will be rotated at a reduced RPM (or reduced atmospheric pressure) so that pad 221 will interfere with the disk surface, which is typically formed of amorphous carbon, and wear down to the level indicated by dashed line 250 in FIG. 3. When this level is reached, the wear will be self-limiting and not continue further because of the support provided by the ABS (surface 216) at the reduced disk RPM. Also, when wear point 250 is reached the overcoat 230 will be completely removed from pad 221, thereby exposing the magnetic elements 240 and 242, 244. This initial wear-in process takes place fairly rapidly, typically within about thirty minutes. When the disk is then rotated at full RPM during normal operation of the disk drive there will be a small, well-defined clearance between the magnetic elements and the disk. The result is a head/disk interface which is near contact or zero interference to provide a very small magnetic spacing and which can be reproduced with a wide range of manufacturing tolerances.

To prevent corrosion of the now-exposed magnetic elements the disk drive is hermetically sealed. Referring again to FIGS. 1A–1B, all electrical leads to drive motor 104, actuator 114 and the read/write head 106 are brought through the base plate 115 of the drive using an electrical feed-through 107, made with glass to metal seals, that provide hermetic seals. This type of hermetically sealed feed-through is described in U.S. Pat. No. 4,841,101. The rim of the glass to metal seal has a compound, which allows it to be welded to the metal of the base plate. Alternatively it may be sealed against the base plate using adhesives or a gasket. The adhesives used are selected so that there is no outgassing of corrosive or other harmful vapors into the disk drive. It is also possible to provide a separate metal header unit that contains the hermetically sealed feed-throughs for ease of assembly. This header unit is then soldered into an opening in the base plate 115. A hermetically sealed container for a PC card or disk drive that uses a header with feed-throughs for the electrical connections is described in U.S. Pat. No. 5,457,606.

Method for Assembling and Sealing the Disk Drive

The disk drive of the present invention may be hermetically sealed as previously described for disk drives that do not operate with self-limiting wear contact pad air-bearing sliders. For example, IBM's U.S. Pat. Nos. 4,367,503 and 4,556,969 describe hermetic sealing techniques for disk drives. IBM's U.S. Pat. No. 5,392,177 describes a hermetically sealed disk drive with humidity control, and Seagate Technology's U.S. Pat. No. 6,317,286 describes a hermetically sealed disk drive that requires a diaphragm to allow for changes in internal pressure.

Before the disk drive is hermetically sealed it is placed in a special chamber where the atmosphere and pressure are selected. This will preferably be the environment in which the initial wear-in of the protrusion pad will be performed, although the initial wear-in can be performed after the disk drive is hermetically sealed. This atmosphere will also preferably be the desired internal atmosphere and pressure of the completed disk drive after sealing. The preferred chamber environment is air at sub-atmospheric pressure and with a controlled humidity. A sub-atmospheric pressure in the completed disk drive allows stresses on the disk drive cover and base plate to be directed inwardly. A dry environment minimizes the susceptibility of the magnetic elements to corrosion. A gaseous environment other than air may also be selected, such as nitrogen or helium.

With the drive in the special chamber, it is then operated to wear away the end of the protrusion pad. During this process, the cover 116 may be in place but with an elastomer seal (not shown) between it and the base plate 115, or the cover 116 may include a small opening (not shown). Either approach maintains the cleanliness of the drive's internal components during the wear-in process. Alternatively, the cover 116 may be removed for the wear-in process. The slider ABS is designed such that for a given pressure it will fly at a fly height lower than the operating fly height if the disk is rotating at an RPM lower than the operating RPM. Thus a lower RPM is selected for the initial wear-in of the protrusion pad. This lower RPM may also selected to be the RPM at which the servo pattern is written on the disks. The sliders are made to access across the disk while the disks are spinning at this selected RPM. The protrusion pad rubs against the disk and is slowly worn away, exposing the magnetic elements. When the pad has worn to an extent that it no longer rubs against the disk (line 250 in FIG. 3), the wear ceases. The initial height of the protrusion pad is designed so that after the wear has been completed, the carbon overcoat on the pad has been removed. The aim of this burnishing process is to enable the read/write head magnetic elements to be as close to the disk as possible while ensuring that there is no harmful interaction of the protrusion pad with the disk during normal full-RPM operation of the disk drive. Because the disk drive is in the special chamber with the controlled atmosphere there is no risk of corrosion of the magnetic elements even though the carbon overcoat has been removed. Another method for the burnishing of the protrusion pad, other than rotating the disk at an RPM below the operating RPM, is to use reduced pressure to temporarily lower the fly height of the slider. Also, the burnishing of the protrusion pad can be performed after the disk drive is hermetically sealed, in which case the preferred method is to use reduced RPM because the internal pressure can not be varied once the drive is hermetically sealed.

Next the servo patterns are written on the disk using conventional servo writing techniques. This provides the special patterns on the disks that are used by the servo control system to position the read/write heads to the desired data tracks and to maintain them on track during read and write operations. Because the disk drive is not yet hermetically sealed, it can now be subjected to the usual tests to ensure its functionality and reliability. The components in the drive may then be exchanged if necessary until the drive tests are performed satisfactorily. The cover 116 is then placed over the base plate 115 with the cover flange 117 located over base plate flange 119. The cover and base plate, which are typically formed of aluminum, are then laser welded together using conventional laser welding tools and processes. This is shown as continuous butt weld joint 121 at the ends of flanges 117, 119. Commercially available systems for small scale laser welding of aluminum and other alloys include those from Equilasers Incorporated.

The hermetically sealed disk drive according to the present invention may also include an inner "removable" seal to provide for rework prior to final hermetic sealing. One approach is to manufacture the drive in a manner similar to the conventional method, using a conventional elastomer gasket which is somewhat permeable to water to temporarily seal the drive through the manufacturing process, and allow for rework of unsatisfactory drives. Once the drive has been adequately tested and is ready to ship, the outer laser-welded hermetic seal 121 is formed or a polymer sealant is applied around the perimeter of the cover and base plate and cured in place to generate a permanent hermetic and non-removable seal over the gasket. In the embodiment using an outer polymer sealant the gasket would be located between the flanges 117, 119 (FIG. 1A) and the polymer sealant would be formed where laser weld 121 is shown. Another approach is to enclose a conventional drive with an elastomer gasket (either with or without its electronics card) inside a secondary thin sheet metal enclosure, similar to a hermetically sealed metal food container or "can". In this embodiment the secondary enclosure may be a second cover located over cover 116 and hermetically sealed to the base plate 115.

Hermetically sealed drives are subject to external atmospheric pressure variations and must tolerate such stresses on the enclosure. Since it is generally desirable to operate a drive at less than atmospheric pressure for power and servo considerations, the hermetically sealed drive permits operation at sub-atmospheric internal pressure. This would limit the stresses on the enclosure to a single direction (inward), simplifying structural design of the enclosure. For example, if the hermetic seal is formed by a thin outer shell around a conventional disk drive, then the shell can be supported against collapse by resting against the more rigid structure inside, i.e., the outer "can" is fit tightly against the rigid inner enclosure.

The completed disk drive has very low magnetic spacing due to the removal of the carbon overcoat and the use of the protrusion pad to locate the magnetic elements close to the disk. However, the head overcoat is present during all head manufacturing and disk drive assembly steps, so that corrosion of the magnetic elements is prevented during these steps.

In addition to being "air tight", the hermetic seal must have low permeability to water, meaning that over the lifetime of the disk drive (e.g., 10 years), the flow of water through the seal must be low enough that the relative humidity (RH) inside the drive does not go beyond an upper target level, regardless of the external humidity. For a specific set of materials used in the magnetic elements, corrosion will occur above this experimentally predetermined target value. For some materials used in the magnetic elements, this value would be approximately 40% RH, although other materials may be more or less sensitive to high RH, and some materials may not experience corrosion until above approximately 80% RH. For a disk drive at 40% RH at room temperature, the RH would go to condensing (100% RH) if the temperature dropped to 10° C. if there were no devices inside the drive to act as humidity buffers, such as carbon, silica gel, and some polymers. This would be catastrophic to most unprotected magnetic element materials. For this reason, and because it may be difficult to achieve a seal with absolutely no permeability to water, it may still be desirable to limit the humidity in the hermetically sealed low-humidity environment by the use of a dessicant. Also, it is possible that total elimination of moisture may not be the optimal solution since it is believed that operation of a disk drive below 5% RH may contribute to flyability failures. Some amount of water may play an essential role in the durability of the disk-lubricant-head interface system and in preventing electrostatic discharge (ESD). Thus it may be desirable to maintain the humidity above a certain lower target level (e.g., 5% RH) by the use of a humidity buffer or reversible desiccating agent which is capable of not only absorbing moisture but also discharging moisture over a wide temperature range. U.S. Pat. Nos. 5,075,807 and 4,831,475 describe the use of desiccants and humidity buffers in conventional disk drives with breather ports.

Because the disk drive is a hermetically sealed enclosure with controlled humidity, such that water condensation or sublimation cannot occur at anticipated storage or operation temperatures, the magnetic elements are not subject to corrosion during operation of the disk drive.

An additional advantage of the hermetically sealed disk drive is that it is not subject to fly height variations due to atmospheric pressure changes. Therefore, a hermetically sealed drive eliminates an additional fly height tolerance which allows the protrusion pad air bearing slider to maintain its low magnetic spacing. However, with the drive hermetically sealed, temperature variations will result in pressure changes inside the drive, according to the ideal gas law $P\sim nRT/V$, where P is the pressure, T is the temperature in Kelvins, V is the volume, n is the number of moles of gas and R is the gas constant. Over the usual range of 5–65° C. (278–338 K) there is a +/−10% variation in internal pressure. This is comparable to a 0–10,000 ft altitude variation, which is a requirement for conventional disk drives.

In addition to limiting water content to a low level, the hermetically sealed disk drive may also contain a vapor phase corrosion inhibitor (VPCI). Vapor drains or other "getter" techniques can be used to scavenge undesirable corrosive agents that may outgas from drive components over the life of the drive. IBM's pending application "Magnetic Recording Device with Improved Reliability", Ser. No. 10/051,866 filed Jan. 15, 2002, describes a disk drive with a self-limiting wear pad air bearing slider and a VPCI. The VPCI package described in the co-pending application includes at least one vapor phase corrosion inhibitor (VPCI) embedded in a polymeric matrix with the weight of the VPCI in the range of 0.1% to 20% of the weight of the polymeric matrix. The polymeric matrix can be a thermoplastic polymeric matrix or an elastomer matrix. The VPCI is selected so as not to degrade the mechanical performance of the disk drive and not to form particles inside the disk drive. The VPCI typically includes a triazole, such as benzotriazole, optionally carrying pendant groups such as tolyltriazole, or a salt of a primary or secondary amine with an organic acid, such as dicyclohexylammonium benzoate or isopropylcyclohexylammonium anisoate, and an amine salt in combination with an inorganic acid, such as dicyclohexylammonium nitrite. Specifically, VPCI includes 5-methyl benzotriazole, benzotriazole, butylated hydroxy toluene, di-tert-butyl benzoquinone, octafluoro hexanediol, dicyclohexylammonium benzoate, and their combinations. 5-methyl benzotriazole, benzotriazole, and dicyclohexylammonium benzoate are preferred materials. The VPCI molecules emanate from the VPCI package to the vapor phase of the disk drive enclosure. The components of the VPCI have sufficient vapor pressures to provide finite concentrations in the vapor phase of the disk drive enclosure and adsorbed films on exposed surfaces of the head and the disk. The vapor pressure is typically within $10^{-4}$ Pa to $10^3$ Pa between 20° C. and 100° C. The thickness of the adsorbed film is determined by the vapor phase concentration of the VPCI and their adsorption isotherm. The adsorbed film thickness is typically between 0.1 nm and 5 nm, preferably 0.5 nm to 1 nm. Therefore, the VPCI components are selected to provide a predetermined adsorbed film thickness. The maximum thickness of the adsorbed film is selected so as not to interfere with the physical spacing of the head flying over the disk. Item 118 in FIGS. 1A–1B represents the optional dessicant, humidity buffer or VPCI package.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording disk drive comprising:

a rotatable magnetic recording disk;

a slider having a gas-bearing surface for maintaining the slider near the surface of the disk when the disk is rotating;

a head supported on the slider and having a magnetic element for reading data from or writing data to disk, the magnetic element being formed of a material corrosive to an environment having a relative humidity greater than a predetermined value, the magnetic element being covered by a protective coating that wears away when in contact with the rotating disk;

an actuator connected the slider for moving the slider and head across the surface of the disk; and a hermetically sealed housing surrounding the disk and slider and providing a gaseous environment having a relative humidity less than said predetermined value, whereby said gaseous environment is non-corrosive to the magnetic element after the protective coating has been worn away.

2. The disk drive of claim 1 wherein the gas in the housing environment is air and further comprising humidity control material located within the housing for maintaining the humidity in the environment below said predetermined level.

3. The disk drive of claim 2 wherein the humidity control material comprises a humidity buffer for maintaining the humidity within a predetermined range.

4. The disk drive of claim 1 wherein the gas in the housing environment is air and further comprising a volatile corrosion inhibitor located within the housing for preventing corrosion of the magnetic element.

5. The disk drive of claim 1 wherein the gas in the housing environment consists essentially of a gas selected from the group consisting of air, helium and nitrogen.

6. The disk drive of claim 1 wherein the head includes an inductive write head, and wherein the magnetic element is a write pole formed of an alloy comprising Co and Fe.

7. The disk drive of claim 1 wherein the head includes a read head, and wherein the magnetic element is a magnetoresistive read element.

8. The disk drive of claim 1 wherein the magnetic element is supported on the slider within a wearable pad that extends beyond the gas-bearing surface of the slider, the wearable pad including the protective coating.

9. The disk drive of claim 1 wherein the protective coating consists essentially of amorphous carbon.

10. The disk drive of claim 1 wherein the disk includes a protective coating consisting essentially of amorphous carbon.

11. The disk drive of claim 1 wherein the sealed housing comprises a base plate and a cover hermetically sealed to the base plate.

12. The disk drive of claim 11 wherein the cover is laser welded to the base plate.

13. The disk drive of claim 12 further comprising an elastomer gasket between the cover and the base plate for providing a removable seal during assembly of the disk drive.

14. The disk drive of claim 11 further comprising and elastomer gasket between the cover and the base plate for providing a removable seal, and a hermetic polymer seal outside the gasket and in contact with the cover and base plate.

15. The disk drive of claim 1 wherein the sealed housing comprises a base plate, a first cover, a gasket sealing the first cover to the base plate, and a second cover over the first cover and hermetically sealed to the base plate.

16. A magnetic recording disk drive comprising:
a rotatable magnetic recording disk;
a slider having a gas-bearing surface for maintaining the slider near but out of contact with the disk when the disk is rotating at its operating speed and a protrusion pad having an end that extends beyond the gas-bearing surface of the slider toward the disk;
a read/write head supported within the protrusion pad and comprising a magnetoresistive read element for reading data on the disk and write poles for writing data on the disk, the read element and write poles being formed of materials corrosive to an environment having a relative humidity greater than a predetermined value and the ends of the read element and write poles extending to the end of the protrusion pad and having no protective coating;
an actuator connected to the slider for moving the slider and head across the disk when the disk is rotating; and
a sealed housing surrounding the disk and slider and providing a gaseous environment having a relative humidity less than said predetermined value, the pressure within the sealed housing being substantially independent of external ambient pressure.

17. The disk drive of claim 16 wherein the gas in the housing environment is air and further comprising humidity control material located within the housing for maintaining the relative humidity in the environment below said predetermined value.

18. The disk drive of claim 17 wherein the humidity control material comprises a humidity buffer for maintaining the relative humidity in the environment above approximately 5%.

19. The disk drive of claim 16 wherein the gas in the housing environment is air and further comprising a volatile corrosion inhibitor locate within the housing.

20. The disk drive of claim 16 wherein the gas in the housing environment consists essentially of a gas selected from the group consisting of air, helium and nitrogen.

21. The disk drive of claim 16 wherein the write poles are formed of an alloy comprising Co and Fe.

* * * * *

UNITED STATES PATENT AND TRADEMARK OFFICE
CERTIFICATE OF CORRECTION

PATENT NO. : 6,762,909 B2
DATED : July 13, 2004
INVENTOR(S) : Thomas R Albrecht et al.

It is certified that error appears in the above-identified patent and that said Letters Patent is hereby corrected as shown below:

<u>Column 8,</u>
Line 57, the word -- the -- should be inserted between the words "to" and disk".
Line 63, the word -- to -- should be inserted between the words "connected" and "the".

<u>Column 9,</u>
Line 43, the word "and" should be replaced with the word -- an --.

<u>Column 10,</u>
Line 40, the word "locate" should be replaced with the word -- located --.

Signed and Sealed this

Seventeenth Day of August, 2004

JON W. DUDAS
*Acting Director of the United States Patent and Trademark Office*